United States Patent
Gerace et al.

(10) Patent No.: US 6,455,598 B1
(45) Date of Patent: Sep. 24, 2002

(54) ROOF SEALANT COMPOSITION AND METHOD OF APPLYING

(75) Inventors: Michael Joseph Gerace, Dayton; Yasminka Landaburu, Yellow Springs; Timothy P. Klosterman, Laura, all of OH (US)

(73) Assignee: Aster Roof Cover, Inc., Charleston, SC (US)

(*) Notice: Subject to any disclaimer, the term of this patent is extended or adjusted under 35 U.S.C. 154(b) by 0 days.

(21) Appl. No.: 09/425,389

(22) Filed: Oct. 22, 1999

(51) Int. Cl.$^7$ .............................................. C08J 11/04
(52) U.S. Cl. ........................................................ 521/41
(58) Field of Search ............................................ 521/41

(56) References Cited

U.S. PATENT DOCUMENTS

| | | | |
|---|---|---|---|
| 4,016,323 A | 4/1977 | Volovsek | |
| 4,241,107 A | 12/1980 | Mandish et al. | |
| 4,588,634 A | 5/1986 | Pagen et al. | |
| 5,234,988 A | * 8/1993 | Brooks | 524/526 |
| 5,466,739 A | * 11/1995 | Maeda | 524/525 |
| 5,543,455 A | * 8/1996 | Shah | 524/521 |
| 5,726,242 A | * 3/1998 | Kusuoka | 524/839 |
| 5,741,828 A | * 4/1998 | Stoy | 524/501 |
| 5,744,229 A | * 4/1998 | Gleason | 428/297.4 |
| 5,880,218 A | 3/1999 | Gerace et al. | |
| 5,900,061 A | 5/1999 | Wright | |

OTHER PUBLICATIONS

Quit worrying about your roof, ACRYLINK, Isothermal Protective Coatings, Inc.
Roofing Systems Technical Specifications Manual, ACRYLINK, Isothermal Protective Coatings, Inc.
Superior Quality Elastomeric Products For Roofs, Walls and Decks, '98–'99 Catalog, Snow Roof Systems, pp. 10–13.

* cited by examiner

*Primary Examiner*—Paul R. Michl
(74) *Attorney, Agent, or Firm*—Killworth, Gottman, Hagan & Schaeff, L.L.P.

(57) ABSTRACT

A roof sealant composition and method for treating roof constructions is provided in which a roof sealant composition including from about 25 to 60% by weight recycled paint sludge is applied to a roof in a first coating followed by the application of a supportive mesh. A second coating of the sealant composition is applied as a top coat. Upon drying, a composite is formed which exhibits elongation of greater than 300% and a tensile strength of greater than 500 psi and provides resistance to cracking and leaks.

9 Claims, No Drawings

ROOF SEALANT COMPOSITION AND METHOD OF APPLYING

BACKGROUND OF THE INVENTION

This invention relates to a roof sealant composition, and more particularly, to a roof sealant which contains recycled paint sludge and a method for constructing a new or restoring an existing roof utilizing such a roof sealant.

Various types of materials are used for commercial and industrial roofing constructions. One common roofing construction is referred to as a builtup roof. Such a roof covering may comprise the application of a tar or asphalt base in multiple layers which are sometimes coated with loose gravel or aluminized reflective paint. Other common roof constructions include single-ply membrane roofs, which are generally comprised of EPDM, hypalon, or polyvinyl chloride. Another commonly used roof construction utilizes sheets of metal which are seamed together and adhered with sealant.

A present concern in the roofing industry is building roofs which will withstand a variety of weather conditions while providing long-lasting protection. For example, U.S. Pat. No. 4,016,323 teaches a method of constructing a new roof system which utilizes a membrane comprising a fiberglass mesh having a rubberized asphalt adhesive on one side which adheres to the roof deck and a bituminous compound on the other side. Foam insulation is applied over the membrane followed by the application of a top layer of an elastomer.

Of further concern in the industry is extending the life of existing roof structures in order to avoid the expense of removing and replacing an entire roof. U.S. Pat. No. 4,241,107 teaches a method of coating an existing roof structure in which a cementitious coating is applied over a reinforcement of tar and felt paper covered with a wire mesh. A sealant comprising a rubberized or cement sealant is then applied over the cured coating.

However, the majority of sealant systems currently available are comprised of relatively expensive materials and the sealant compositions often contain solvents which leads to undesirably high volatile organic content (VOC) levels.

Accordingly, the need remains in the art for a method of treating a new or existing roof construction which utilizes cost-effective, environmentally friendly materials and which provides effective adhesion and sealing characteristics.

SUMMARY OF THE INVENTION

The present invention solves those needs by providing a roof sealant composition containing recycled paint sludge as a component and a method of treating a new or existing roof structure using such a sealant. The roof sealant is economic to produce, is environmentally friendly, provides excellent adhesion to various substrates, and exhibits good weathering characteristics.

According to one aspect of the present invention, a method is provided for treating a roof construction comprising the steps of applying a first coat of a roof sealant composition including recycled paint sludge onto the roof; applying a supportive mesh over the sealant; and applying a second coat of the roof sealant composition over the mesh. The method further includes the step of allowing the first coat of roof sealant to dry prior to applying the second coating, and allowing the second coat of the roof sealant composition to dry. Preferably, the mesh comprises a polyester mesh. Upon drying, a composite is formed which comprises the first and second dried roof sealant coating layers with the mesh layer inbetween. The composite exhibits elongation of greater than 300% and a tensile strength of greater than 500 psi.

The roof sealant composition preferably comprises from about 25 to 60% by weight recycled paint sludge and from about 30 to 50% by weight of an emulsion containing an elastomer. Preferably, the elastomer is a vinyl acetate-ethylene copolymer. The recycled paint sludge is preferably provided in the form of a water-based emulsion which preferably includes at least one non-ionic surfactant.

The roof sealant composition preferably further comprises from about 1 to 15% by weight fibers, preferably cellulose fibers, from about 0 to 5% by weight of a plasticizer, from about 0 to 1% by weight of a defoaming agent, from about 0 to 1% by weight of a microbiocide, from about 0 to 1% by weight of an antioxidant, from about 0 to 0.1% by weight of a UV light stabilizer, and from about 0 to 0.2% by weight of a UV light absorber.

The roof sealant composition (prior to application) preferably has a viscosity of from about 1000 cps to 3000 cps and a solids content of about 50 to 65% by weight. The roof sealant composition has a volatile organic content of less than 1 g/liter.

The roof sealant composition may be applied to a roof construction by rolling, brushing, troweling, or spraying. Upon drying, the roof sealant preferably exhibits elongation of between about 600 to 1200%, a tensile strength of greater than 50 psi, and a Shore A hardness of about 40.

Accordingly, it is an object of the present invention to provide an economical, environmentally friendly roof sealant composition and method for treating roofs which provides excellent adhesion and durability. This, and other objects and advantages of the present invention will become apparent to those skilled in the art from a reading of the following detailed description of the preferred embodiments and the appended claims.

DETAILED DESCRIPTION OF THE PREFERRED EMBODIMENTS

The roof sealant composition of the present invention exhibits excellent adhesion to a variety of roofing substrates including asphalt, asphalt shingles, galvanized steel, aluminum, painted surfaces, wood, masonry and brick. The roof sealant composition may be applied to a variety of roofing constructions including flat and low-slope roofs and other areas prone to leakage such as sealing seams, flashings, cracks, vents and skylights. The recycled paint sludge in the sealant composition provides several advantages over previously used sealant compositions in that it promotes good adhesion to a variety of substrates, it exhibits good weatherability, apparently due to the inherent presence of stabilizers in the paint sludge, and it is economical to use.

The recycled paint sludge may be prepared from paint sludge from the automotive industry, appliance industry, metal fabricating industry or other sources. The preferred method for making the paint sludge is described in U.S. Pat. No. 5,880,218, assigned to the same assignee as the present invention, the disclosure of which is hereby incorporated by reference. The paint sludge may essentially be produced by any method which is capable of removing water and/or solvent from raw paint sludge without curing the polymers in the paint sludge. After removal of water and/or solvent, the treated paint sludge is then preferably formed into an emulsion by combining the sludge with one or more non-ionic surfactants and water until a solids content of about 54–58% is achieved. Suitable non-ionic surfactants for use in the present invention include Tergitol XD, available from Union Carbide, and T-Det-N20, available from Harcros.

The recycled paint sludge emulsion is then formed into a roof sealant by combining it with the elastomeric latex emulsion, a defoamer, and a microbiocide. A preferred elastomeric emulsion is Airflex 526 BP, a vinyl acetate-ethylene copolymer water-based emulsion available from Air Products. Other suitable elastomers which may be used in the present invention include acrylic resins, neoprene, and nitrile rubbers.

Cellulose fibers are also preferably added to the mixture for purposes of providing rheological control. A stabilizing mixture is also preferably added to the emulsion which includes a plasticizer, antioxidant, a UV light stabilizer, and a UV light absorber. The resulting sealant composition has a Brookfield viscosity of about 1000 to 3000 cps, and a solids content of between about 50 and 60%. The final sealant composition is a homogeneous liquid which is blue-gray in appearance.

Prior to applying the roof sealant composition to a roof structure, the roof is preferably preconditioned as necessary by bridging any holes with fabric or mesh, treating rust, i.e., removing rust and/or priming, removing any stone ballast present, and pressure washing to remove any loose dirt or debris.

The first coat of roof sealant is then preferably applied at about 1.5 gallons per 100 square feet at a thickness of about 40 mils. The roof sealant composition may be applied by rolling, brushing, troweling, or spraying. The sealant is preferably applied at temperatures of about 50° F. or higher.

The supportive mesh is preferably applied immediately after application of the first coat of sealant. A preferred mesh for use in the present invention is a spun polyester mesh, however any suitable supportive mesh may be used such as a fabric mesh or fiberglass mesh.

The first coat of sealant composition with the mesh is then allowed to dry sufficiently, which takes a minimum of about one hour, depending on the temperature and humidity. The second coat of sealant is then applied over the mesh as a top coat, preferably at about 1.5 gallons per 100 square feet, and then dried. Upon curing, the dried roof sealant (each layer) is about 20 mils thick and has a Shore A hardness of about 40. The dried roof sealant exhibits an elasticity of about 100 PSI, 1000% elongation. Because of its increased elasticity, the sealant is able to survive the winter freeze/thaw cycling better than most commercially available sealants. The dried sealant is also seamless, provides resistance to cracking, and prevents leaking even when roof materials shift.

It should be appreciated that an additional layer of ceramic granules, or grit, may be applied to the top layer of roof sealant composition to provide the resulting composite with resistance to UV light or for aesthetic purposes, e.g. to provide a continuous shingle-like appearance. The ceramic granules are preferably applied at about 0.60 lbs/square foot over the second coat of sealant composition while it is still wet. After the second coat has dried, the excess granules may be swept away. Suitable ceramic granules for use in the present invention are available from Tamko, Joplin, Missouri.

It should further be appreciated that because application of the roof sealant coating layers and mesh results in an impermeable membrane, it is desirable, after the layers have dried, to install breathing vents about every 400 square feet in any areas of the roof which may trap moisture. Such vents may consist of vertical 4-inch pipes which are open to the outside and which penetrate the roof membrane to provide a path for the moisture to escape.

In order that the invention may be more readily understood, reference is made to the following examples which are intended to illustrate the invention, but not limit the scope thereof.

EXAMPLE 1

A roof sealant composition was prepared in accordance with the present invention. Into a ribbon blender was loaded 1337 pounds of recycled paint sludge prepared as set forth in U.S. Pat. No. 5,880,218, 137 lbs Tergitol XD (non-ionic surfactant from Union Carbide) and 46 lbs T-Det-N-20 (non-ionic surfactant from Harcros). The mixture was heated and mixed for approximately 1 hour followed by the addition of 30 gallons of water and then mixed further until the mixture became homogeneous. The contents were then transferred to a reactor vessel and 95 gallons of warm water was added. Mixing was continued at a temperature of about 140° F. for about 15 minutes to obtain a smooth dispersion. Water was then added to adjust the % solids to between about 50 to 65%. The mixture was then passed through a 90 mesh screen to obtain a smooth homogeneous emulsion having a viscosity of between about 800 cps to 2000 cps and a solids content of about 56%.

To 1250 pounds of the resulting recycled sludge emulsion in a reactor vessel was added 716 lbs of Airflex 526 BP (vinyl acetate-ethylene emulsion from Air Products), 12 lbs. Colloid 643 (defoamer from Rhone-Poulenc) and 1.4 lbs of Kathon LX 1.5% (microbiocide from Rohm & Haas). The components were mixed for about 15 minutes until homogeneous. After an addition of 119 lbs. of RT fibers (cellulosic fibers from Interfiber) to the vessel, the material was mixed for approximately 15 minutes until the fibers were completely dispersed. Then, 370 lbs. of Airflex 526 BP was then added and mixed for about 15 minutes until homogeneous. A stabilizer package was then added which was prepared from a mixture of 23.9 lbs. Santicizer 160 (plasticizer from Monsanto), 4.8 lbs. Irganox 1010 (antioxidant from Ciba-Geigy), 1.2 lbs. Tinuvin 292 (UV light stabilizer from Ciba-Geigy) and 2.4 lbs. Tinuvin 1130 (UV light absorber from Ciba-Geigy).

The resulting roof sealant was dried and tested for elongation and tensile strength using an Instron testing machine (model T-1000). The aging tests were conducted using a Xenon Arc weatherometer following the tested procedure called out by ASTM D4798.

| Elongation @ break | |
| --- | --- |
| Initial | 1142% |
| Aging | |
| 1000 hours | 1095% |
| 3000 hours | 1003% |
| Tensile strength (PSI) | |
| Initial | 57 |
| Aging (Xenon Arc) | |
| 1000 hours | 111 |
| 3000 hours | 137 |

After 3000 hours of accelerated aging exposure (equivalent to approximately 3 years of natural weathering), the dried sealant was shown to retain 89% of the original elongation with an increment of 40% in tensile strength.

The roof sealant of the present invention was also tested for adhesion to a number of different substrates using the method of ASTM D3808-92. The results are shown below in Table 1.

TABLE 1

Key to grading 0----------10
Poor  Excellent

| Substrate | Adhesion |
|---|---|
| Galvanized metal | 7 |
| Painted galvanized metal | 8 |
| Emulsified asphalt | 8 |
| Hot asphalt type III | 9 |
| SBS modified asphalt | 7 |
| Roll roofing | 9 |
| Glass Ply IV | 8 |
| Aluminum | 7 |
| EPDM | 4 |
| Aluminum paint | 9 |
| Wood | 8 |
| Concrete | 8 |

EXAMPLE 2

The roof sealant of the present invention was compared with another commercially available sealer, Etema-Seal, available from Truco Inc., Cleveland, Ohio. The performance and properties of the two sealers are shown in comparison in Table 2 below.

TABLE 2

| Properties | Roof Sealant | Eterna-Seal |
|---|---|---|
| Appearance | Homogeneous, smooth liquid | Homogeneous, smooth thick liquid |
| % solids (wt) | 58% | 65% |
| wt/gal. | 8.5 lbs/gal. | 12.4 lbs/gal. |
| % polymer solids | 48% | 20% |
| % elongation (ASTM D412) | 800% | 300% |
| Tensile strength (ASTM D412) | 100 PSI | 250 PSI |
| Cold Flex @ −15° F. | Pass | Pass @ 0° F. |
| Weatherometer (Xenon Arc) 3000 hours | | |

TABLE 2-continued

| Properties | Roof Sealant | Eterna-Seal |
|---|---|---|
| no cracking or chalking | Pass | Slight chalking |
| weathered tensile strength | 140% of original | N/A |
| weathered elongation | 89% of original | N/A |
| Adhesion (ASTM D 3359) | | |
| Metal | Excellent | Excellent |
| Painted metal | Excellent | Satisfactory |
| EPDM | Satisfactory | N/A |
| Asphalt surfaces | Excellent | Excellent |

It will be obvious to those skilled in the art that various changes may be made without departing from the scope of the invention which is not to be considered limited to what is described in the specification.

What is claimed is:

1. A roof sealant composition comprising from about 25 to 60% by weight recycled paint sludge, and from about 30 to 50% by weight of an emulsion containing an elastomer.

2. The roof sealant composition of claim 1 further comprising from about 1 to 15% by weight fibers.

3. The roof sealant composition of claim 1 wherein said paint sludge is in the form of a water-based emulsion comprising recycled paint sludge, a non-ionic surfactant, and water.

4. The roof sealant composition of claim 1 wherein said elastoner is vinyl is acetate-ethylene.

5. The roof sealant composition of claim 1 further including a defoaming agent, a microbiocide, a plasticizer, an antioxidant, a UV light stabilizer, and a UV light asborber.

6. The roof sealant composition of claim 1 having a viscosity of from about 1000 cps to 3000 cps.

7. The roof sealant composition of claim 1 having a solids content of about 50 to 65% by weight.

8. The roof sealant composition of claim 1 wherein said fibers comprise cellulosic fibers.

9. The roof sealant composition of claim 1 having a volatile organic content of less than 1 g/liter.

* * * * *